UNITED STATES PATENT OFFICE 2,209,215

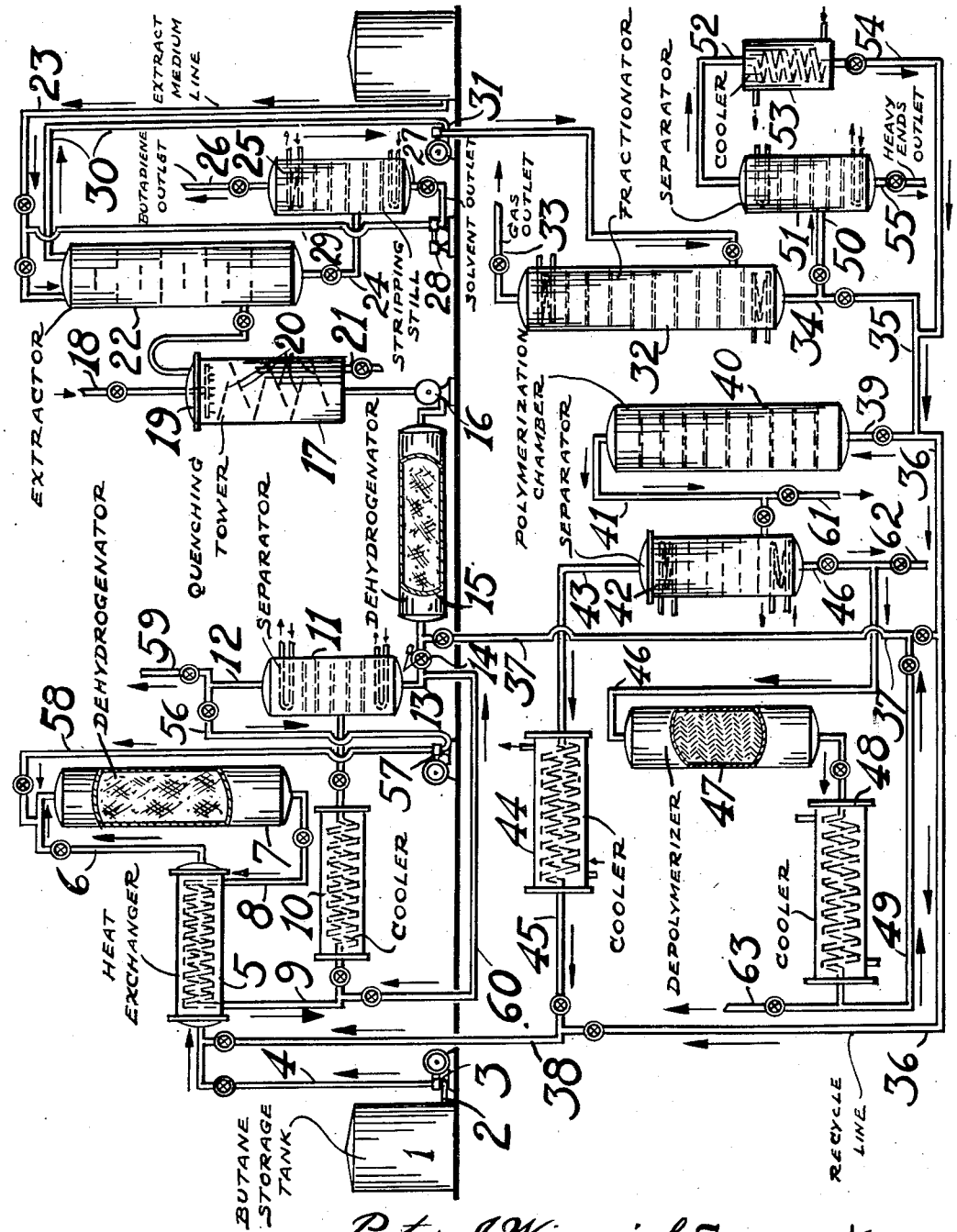

PRODUCTION OF BUTADIENE

Peter J. Wiezevich and Raphael Rosen, Elizabeth, N. J., said Wiezevich now by judicial change of name Peter J. Gaylor, assignors to Standard Oil Development Company, a corporation of Delaware Application July 15, 1936, Serial No. 90,668

2 Claims. (Cl. 260—680)

This invention relates to the production of butadiene. More specifically, it deals with a process involving dehydrogenation or cracking of normal butane to butylene, immediate removal of fixed gases, especially hydrogen, and dehydrogenation of the butylene under reduced pressure at a high temperature level and high feed rate.

Butadiene is a very desirable raw material for the production of a synthetic rubber which is in many respects superior to natural rubber, as for example, with respect to wear, oxidation, etc. However, the uses of such synthetic rubber have been restricted due to the high cost in comparison with natural rubber. The reason for such cost is that the commercial process so far developed for the preparation of butadiene involves five reactions, i. e. (1) formation of acetylene, (2) conversion of acetylene to acetaldehyde, (3) condensation of the aldehyde to aldol, (4) hydrogenation of the aldol to butylene glycol, and (5) dehydration of the glycol to butadiene. Even if good yields are obtained in the individual reactions, considerable losses are incurred and handling and fixed charges are high. An object of this invention therefore is to afford a simple, efficient method for producing butadiene. Further objects will be apparent from the following disclosure.

The process involved in the present invention consists in catalytically dehydrogenating n-butane (which is a common constituent of natural gas) to butylene, maintaining a conversion of about 20-60%, removing hydrogen and fixed gas (methane, ethane, etc.) from the resulting mixture, and dehydrogenating again in presence of a catalyst under a vacuum under conditions to give a 10-30% butadiene in the exit gas. The resulting reaction mixture is again freed from hydrogen and fixed gas, the butadiene removed, and the remaining C4 hydrocarbons are recycled to the first step.

The dehydrogenation of normal butane to butadiene involves the following two reactions:

$$C_4H_{10} = C_4H_8 + H_2$$
$$C_4H_8 = C_4H_6 + H_2$$

With an active catalyst, excessive temperature and sufficiently low throughput, it is possible to produce substantial amounts of butadiene in one step by dehydrogenation of butane. This has been found to be impractical since the conditions are so severe as to cause the formation of cracked by-products and carbon, greatly lowering the efficiency.

It is also possible to convert butane substantially completely into butylene and cracked products in one step and then to convert completely butylene into butadiene and cracked products in a second step. However, as illustrated by this invention, such a process is not very practical because when substantially complete one-pass conversion of butane is carried out in one pass some butadiene is formed which causes rapid coking up of the catalyst in the second stage.

It has now been found that in the case of the first step given above, butadiene formation is very low until a conversion of about 40-60% of the butane is reached, when the butadiene production increases at a rapid rate.

Therefore, this invention involves the formation of butylene from butane in the first stage without substantial production of butadiene, and the catalyst life in the second step is thereby greatly improved. It has likewise been found that deterioration of catalyst is further prevented and efficiency improved if the conversion of butylene in the second stage is not over 30-40%.

The accompanying figure shows in diagrammatic sectional elevation a preferred embodiment of this invention. Butane from storage 1 is led through line 2 into compressor 3 whereby it is compressed to a pressure sufficient to maintain it in the liquid phase at room temperature. This pressure may be in the neighborhood of 25-80 lbs. per square inch gage. The butane is then pumped through line 4 into heat exchanger 5, line 6 and thence into dehydrogenator 7. This vessel is preferably filled with a dehydrogenating catalyst, such as chromium oxide on alumina, and maintained at a temperature of about 900-1200° F. At this stage, 20-40% of the butane is converted into butylene, and some slight cracking occurs resulting in the production of a small amount of $C_1$, $C_2$ and $C_3$ hydrocarbons, but the main constituent of the fixed gas is hydrogen.

Upon leaving the dehydrogenator through line 8 the reaction mixture is cooled by the feed in heat exchanger 5, and led through line 9 and cooler 10 into separator 11. The latter serves to separate the fixed gas from the $C_4$ hydrocarbons and may be a fractionating column from which the fixed gases are bled at 12, and the butylene and unconverted butane are drawn off at line 13 where the pressure is released at valve 14, allowing the gaseous $C_4$ hydrocarbons to pass through dehydrogenator 15 which may be at atmospheric pressure although a vacuum of about 20 to 100 or even 200 mm. of mercury is preferably maintained by vacuum pump 16 or similar means. Dehydrogenator 15 is maintained at 1000–1300° F. and is filled with a dehydrogenating catalyst as heretofore indicated. It is preferable to maintain a feed rate of 100 to 300 volumes per volume of catalyst per hour (calculated at 0° C. and 760 mm.) equivalent to a contact time of 0.5 to 2.0 seconds. Under such conditions, the exit gas will contain 7 to 15 or even 20% butadiene. It is also preferable to cause the reaction of the butylene to the extent of 20–40%. Some butane is also dehydrogenated in this operation.

The hot gases leaving vacuum pump 16 are preferably quenched in a quenching tower 17 wherein water or oil or any suitable quenching medium is sprayed by means of pipe 18 and spray 19 over plates or baffles 20, leaving the tower through line 21. After this operation the cooled gases, now at atmospheric pressure, are submitted to any known step for the removal of butadiene, such as a scrubber or extractor 22 through which the water and/or other extracting medium is run in from line 23. The extract containing the diolefin is withdrawn at 24 and passed into a stripping still 25 or other separator whereby butadiene is bled off at the top at 26 and the solvent is removed as bottoms at 27 and pumped by pump 28 back to tower 22 through lines 29 and 23.

The diolefin-free gases leaving extractor 22 are subsequently drawn off at 30 and compressed by compressor 31 to liquefy the C₄ cut which is then separated from the fixed gas and hydrogen by fractionator or separator 32, the fixed gases being discharged at 33, the C₄ cut and any higher hydrocarbons formed leaving the tower at 34. At this point, the mixture may be either returned to the butane dehydrogenator, the butylene dehydrogenator, or polymerizer, depending upon the extent of the dehydrogenation effected in vessels 7 and 15. If a high conversion to butylene is effected in 7, and a lower conversion to butadiene is obtained in 15, it is preferable to recycle the C₄ mixture from 34 through lines 35, 36 and 37 to dehydrogenator 15. On the other hand, if a low conversion is obtained in 7 and a substantially high conversion is effected in 15 without substantial amounts of butylene remaining after removal of butadiene, it is desirable to lead the C₄ mixture through lines 36 and 38 into line 4 with the original feed stock.

However, in the usual case, substantial amounts of butylene are present in the reaction mixture after removal of the butadiene. In such case it is found best to lead the C₄ mixture from line 35 through line 39 into polymerizing chamber 40 maintained at 250–325° F. and filled with 55–65% sulfuric acid or similar polymerization catalyst, converting the butylene into a polymer such as dimer and some trimer and higher polymers which are removed through line 41 and fractionated in separator 42 in which they are removed from the butane which is taken off at the top of the tower at 43, cooled in cooler 44 and run through lines 45 and 38, into the original butane feed stock while the polymers leaving separator 42 at 46 are depolymerized to butylene by heating in vessel 47 at 400–500° F. in presence of a clay of the Marsil type or similar depolymerization catalyst, cooled by cooler 48 and run through lines 49 and 37 into the butylene dehydrogenator 15.

In order to provide for the removal of undesirable higher boiling materials accumulated in the reaction system, the reaction stream leaving separator 32 through line 34 is intermittently led through line 50 into separator or fractionator 51 wherein the C₄ hydrocarbons are removed at 52, cooled at 53, and returned to line 35 through pipe 54, while the higher boiling undesirable ends are removed from the tower through line 55.

In some cases it is found desirable to introduce some hydrogen with the feed stock entering dehydrogenator 7. This is conveniently accomplished by compressing some of the hydrogen leaving separator 11 (through lines 12 and 56) by means of compressor 57 into line 58 and thence into feed line 6 for the butane dehydrogenator, while the excess hydrogen and fixed gas may be bled out or burned from line 59. With a very sensitive catalyst it is often desirable to dilute the inlet feed gas at 6 with as much as 50% (more or less) of hydrogen at the beginning of the operation in order to reduce coking, and to gradually decrease this hydrogen concentration to 30, 20, 10 and even 5% or less after prolonged continuous operation.

Similarly, some of the hydrogen-containing reaction mixture leaving line 9 may be by-passed through line 60 to accomplish the same result in dehydrogenator 15.

Provisions are made for withdrawing liquid polymers at 61, 62 and 63 although it is ordinarily preferable to dehydrogenate completely in one pass regardless of the amount of hydrocarbon fixed gases formed, it is highly desirable for the present process to limit the conversion to only 20–40% per pass, since otherwise the amount of fixed gases formed would interfere with the operation and reduce the efficiency of the system.

The following examples serve to illustrate some of the many phases involved in this invention·

Example 1

Normal butane at atmospheric pressure is passed over a chromium oxide-on-activated alumina catalyst at 1112° F. and a contact time of 2.1 seconds. Under these conditions 42% of the entering butane is converted to butylene per pass.

After removal of the hydrogen and fixed gas by compression of the gaseous mixture to 100 lbs. per square inch gage, the liquid hydrocarbon remaining contains about 50% butylene. This mixture is then passed over chromium oxide on activated alumina at 1070° F. and under 50 mm. of Hg pressure. The feed rate is 132 volumes of gas per volume of catalyst per hour (0° C. and 760 mm.), corresponding to a contact time of 0.35 second under these conditions, 35.4% of the butylene in the gas reacts producing a gas mixture which, upon subsequent removal of fixed gas contains about 18% of butadiene.

The butadiene is removed by extraction of the liquid hydrocarbons with liquid ammonia or ethylene glycol, and the remaining mixture of butane and butylene are passed into 60% sulfuric acid at 235–400° F. to polymerize the butylene. Upon distillation, the polymers removed as bottoms are cracked at 450° F. and depolymerized to butylene and returned to the second dehydrogenation zone, while the overhead from the still consisting substantially of butane is sent back for recycling through the first dehydrogenation zone.

Example 2

Normal butane is dehydrogenated at 932° F. and a pressure of 45 lbs. by passing it over a chromium-alumina catalyst with a contact time of 21.4 seconds. Under these conditions 25% of the ingoing butane is converted into butylene. After removal of the fixed gases the reaction mixture is passed over the same type of catalyst at 1070° F. and 100 mm. Hg pressure.

The resulting gases are then quenched with water and extracted with water followed by acid cuprous chloride solution to remove butadiene, then compressed to about 50 lbs., the fixed gases are removed and the remaining hydrocarbons boiling mainly in the $C_4$ range are recycled to the first dehydrogenating tower.

The foregoing description is not limited to any specific examples or to any theory of reaction but merely to the claims in which it is my intention to cover the invention as broadly as the prior art permits.

We claim:

1. Process for producing butadiene comprising dehydrogenating normal butane in a dehydrogenating step at at least atmospheric pressure, dehydrogenating the resulting products in a second step under vacuum, removing the butadiene formed, separating fixed gases, polymerizing the butylene in the residual hydrocarbons, separating the polymers from the unpolymerized hydrocarbons, depolymerizing the polymers to butylene, recycling the butylene to the second dehydrogenation step heretofore described, and recycling the unpolymerized hydrocarbons to the first dehydrogenation step heretofore described.

2. Process for producing butadiene comprising dehydrogenating normal butane in the presence of hydrogen in a dehydrogenating step at at least atmospheric pressure, dehydrogenating the resulting products in a second step under vacuum, removing the butadiene formed, separating fixed gases, polymerizing the butylene in the residual hydrocarbons, separating the polymers from the unpolymerized hydrocarbons, depolymerizing the polymers to butylene, recycling the butylene to the second dehydrogenation step heretofore described, and recycling the unpolymerized hydrocarbons to the first dehydrogenation step heretofore described.

PETER J. WIEZEVICH.
RAPHAEL ROSEN.